United States Patent
Cusin et al.

(10) Patent No.: US 10,369,660 B2
(45) Date of Patent: Aug. 6, 2019

(54) FABRICATION METHOD INCLUDING A MODIFIED PROFILE-TURNING STEP

(71) Applicant: Nivarox-FAR S.A., Le Locle (CH)

(72) Inventors: Pierre Cusin, Villars-Burquin (CH); Davy Cretenet, La Chaux de Gilley (FR); Marc Stranczl, Nyon (CH); Raphael Garret, La Chaux-de-Fonds (CH)

(73) Assignee: Nivarox-FAR S.A., Le Locle (CH)

(*) Notice: Subject to any disclaimer, the term of this patent is extended or adjusted under 35 U.S.C. 154(b) by 653 days.

(21) Appl. No.: 15/170,218

(22) Filed: Jun. 1, 2016

(65) Prior Publication Data

US 2016/0368093 A1   Dec. 22, 2016

(30) Foreign Application Priority Data

Jun. 16, 2015 (EP) .................................. 15172344

(51) Int. Cl.
| | |
|---|---|
| *B23K 26/21* | (2014.01) |
| *B23K 26/324* | (2014.01) |
| *G04D 99/00* | (2006.01) |
| *G04B 17/34* | (2006.01) |
| *G04B 13/02* | (2006.01) |
| *B23K 26/323* | (2014.01) |
| *G04B 15/14* | (2006.01) |
| *G04B 19/04* | (2006.01) |

(52) U.S. Cl.
CPC ............ *B23K 26/21* (2015.10); *B23K 26/323* (2015.10); *B23K 26/324* (2013.01); *G04B 13/02* (2013.01); *G04B 15/14* (2013.01); *G04B 17/34* (2013.01); *G04B 19/044* (2013.01); *G04D 99/00* (2013.01)

(58) Field of Classification Search
CPC .... B23K 26/21; B23K 26/324; B23K 26/323; B23K 26/32; B23K 26/22; G04D 99/00; G04B 17/34; G04B 13/02; G04B 15/14; G04B 19/004; G04B 17/32; G04B 17/325
See application file for complete search history.

(56) References Cited

U.S. PATENT DOCUMENTS

| | | | |
|---|---|---|---|
| 4,755,085 | A | 7/1988 | Muren et al. |
| 9,951,856 | B2* | 4/2018 | Inui ........................ F16H 55/30 |
| 2011/0103200 | A1 | 5/2011 | Cusin |
| 2012/0159767 | A1 | 6/2012 | Verardo et al. |
| 2014/0198624 | A1 | 7/2014 | Von Gruenigen et al. |

FOREIGN PATENT DOCUMENTS

| | | |
|---|---|---|
| CH | 552 234 | 7/1974 |
| CH | 698 677 B1 | 9/2009 |
| EP | 0 232 692 A2 | 8/1987 |
| EP | 2 317 406 A1 | 5/2011 |
| EP | 2 469 355 A2 | 6/2012 |
| EP | 2 579 104 A2 | 4/2013 |
| EP | 2 757 424 A1 | 7/2014 |

OTHER PUBLICATIONS

European Search Report dated Feb. 8, 2016 in European Application 15172344, filed on Jun. 16, 2015 ( with English Translation and Written Opinion).

* cited by examiner

*Primary Examiner* — David J Walczak
(74) *Attorney, Agent, or Firm* — Oblon, McClelland, Maier & Neustadt, L.L.P.

(57) ABSTRACT

A method for fabrication of a part intended to be welded including a step for forming an oblique wall between two perpendicular surfaces capable of reducing the contact surface of the face to be welded.

12 Claims, 5 Drawing Sheets

FABRICATION METHOD INCLUDING A MODIFIED PROFILE-TURNING STEP

This application claims priority from European Patent Application No. 15172344.2 filed Jun. 16, 2015, the entire disclosure of which is hereby incorporated by reference.

FIELD OF THE INVENTION

The invention relates to a method for fabrication of a face intended to be welded and, more specifically, a face of this type having improved surface flatness.

BACKGROUND OF THE INVENTION

It is known from WO Publication No. 2015/185423 how to form a timepiece component from a part comprising a silicon-based or ceramic-based material which is welded by electromagnetic radiation directly onto another part, such as, for example, a metal or a metal alloy.

In the context of this development, it transpired that it was important for the gap between the parts not to exceed 0.5 micrometer, otherwise they could not be welded.

SUMMARY OF THE INVENTION

It is an object of the present invention to overcome all of part of aforecited drawbacks by proposing a new fabrication method with at least one contact surface having improved flatness that enables parts to be assembled by welding.

To this end, according to a first embodiment, the invention relates to a method for fabrication of a timepiece component including the following steps:
  forming a first part made from metal and a second part made from silicon or from ceramic;
  mounting a surface of the first part on a surface of the second part;
  welding, by laser electromagnetic radiation, the surface of the first part mounted on the surface of the second part, in order to secure them to each other;
characterized in that the step of forming the first part includes the following phases:
  taking a bar;
  profile-turning the bar to form at least one diameter portion comprising a substantially vertical surface and a substantially horizontal surface and an oblique wall between the substantially vertical surface and the substantially horizontal surface, or, alternatively, a curved wall around said substantially horizontal surface, in order to reduce said substantially horizontal surface to receive said surface of the second part.

According to the first embodiment, the fabrication method can advantageously provide a face with a reduced welding surface, or limit it to a line of contact, to diminish the gap between the parts to a value that ensures the welding thereof.

Further, according to a second embodiment, the invention relates to a method for fabrication of a timepiece component including the following steps:
  forming a first part made from metal and a second part made from silicon or from ceramic;
  mounting a surface of the first part on a surface of the second part;
  welding, by laser electromagnetic radiation, the surface of the first part mounted on the surface of the second part, in order to secure them to each other;
characterized in that the step of forming the first part includes the following phases:
  taking a bar;
  profile-turning the bar to form at least one diameter portion comprising a substantially vertical surface and a substantially horizontal surface and an undercut between the substantially vertical surface and the substantially horizontal surface intended to reduce the substantially horizontal surface to receive said surface of the second part.

According to the second embodiment, the fabrication method advantageously ensures an isostatic configuration of the fitting of the part, to diminish the fitting gap between the parts to a value that ensures the welding thereof.

In accordance with other advantageous variants of the invention:
  the second part also includes at least a partial coating of metal, silicon oxide, silicon nitride, silicon carbide or an allotrope of carbon;
  the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof;
  the second part forms all or part of a case, a dial, a flange, a crystal, a bezel, a push-piece, a crown, a case back, a hand, a bracelet or strap, a balance spring, a balance wheel, a pallet-lever, a bridge, an oscillating weight, a wheel or an escape wheel.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

The invention relates to a component formed using a material having no usable plastic range i.e. with a very limited plastic range, with another part comprising the same type of material or a different type of material.

This component was devised for applications in the field of horology and is rendered necessary by the increasing part played by fragile, brittle materials, such as silicon-based or ceramic-based materials. It is possible, for example, to envisage forming a case, a dial, a flange, a crystal, a bezel, a push-button, a crown, a case back, a hand, a bracelet or strap, a balance spring, a balance wheel, a pallets, a bridge or bar, an oscillating weight or even a wheel, such as an escape wheel, entirely or partially from fragile or brittle materials.

Preferably, the silicon-based material used to make the compensated balance spring may be single crystal silicon, regardless of its crystal orientation, doped single crystal silicon, regardless of its crystal orientation, amorphous silicon, porous silicon, polycrystalline silicon, silicon nitride, silicon carbide, quartz, regardless of its crystal orientation, or silicon oxide. Of course, other materials may be envisaged, such as glass, ceramics, cermets, metals or metal alloys. Further, the first silicon-based part may also optionally include at least one partial coating of silicon oxide, silicon nitride, silicon carbide or an allotrope of carbon, depending upon the intended applications of the timepiece component.

As explained above, the other part may include the same type of material or another type of material. Therefore, preferably, the other part is metal-based and may include an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

Figure 1:
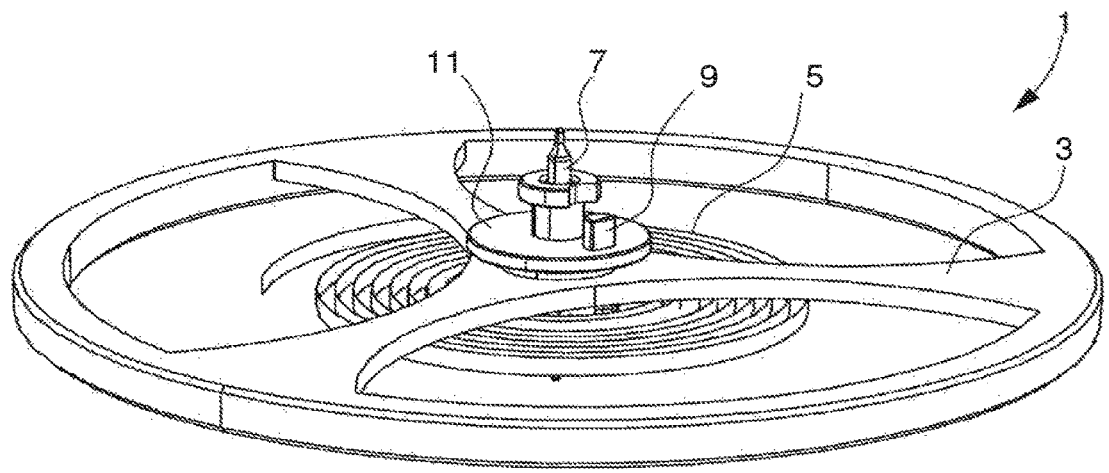
FIG. 1 is a perspective view of a sprung spring balance resonator.

For the sake of simplicity, the explanation below will concern an assembly between a balance spring and a balance staff. FIG. 1 shows a resonator 1 wherein the balance spring 5 is used for temperature compensation of the entire resonator assembly 1, i.e. all the parts and particularly the balance wheel 3 mounted on the same balance staff 7. Resonator 1 cooperates with a maintenance system, such as, for example, a Swiss lever escapement (not shown) cooperating with the impulse pin 9 of table-roller 11 which is also mounted on staff 7.

Figure 2:
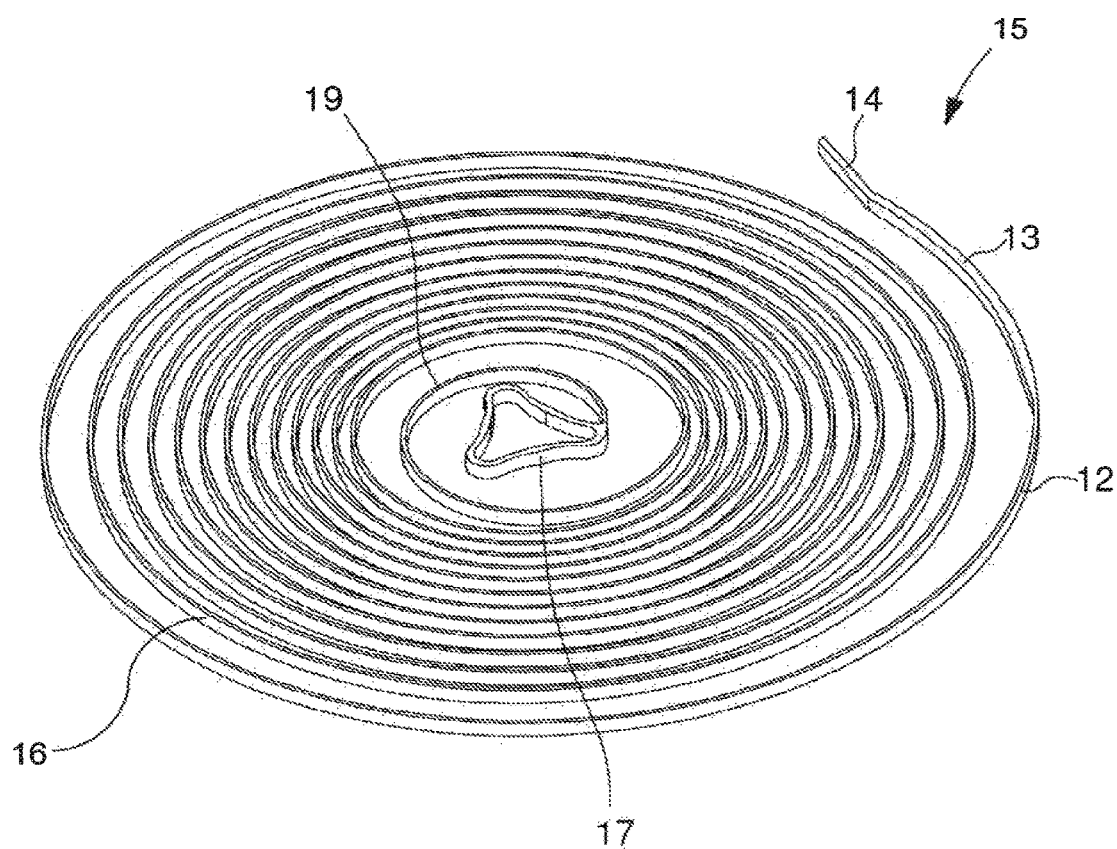
FIG. 2 is a perspective view of a balance spring according to the invention.

A compensating balance spring 15 is shown more clearly in FIG. 2. It includes a single strip 16 wound on itself between an inner coil 19 integral with a collet 17 and an outer coil 12 comprising an end 14 intended to be pinned up to the stud. As seen in FIG. 2, in order to improve the isochronism of the resonator in which balance spring 15 is used, the latter includes an inner coil 19 comprising a Grossmann curve and an outer coil 12 comprising a portion 13 that is thickened relative to the rest of balance spring 15. Finally, it can be seen that collet 17 comprises a single strip extending in a substantially triangular shape so that the collet exhibits elasticity when it is fitted onto the staff, in particular to enable it to be centred relative to the staff.

Figure 3:
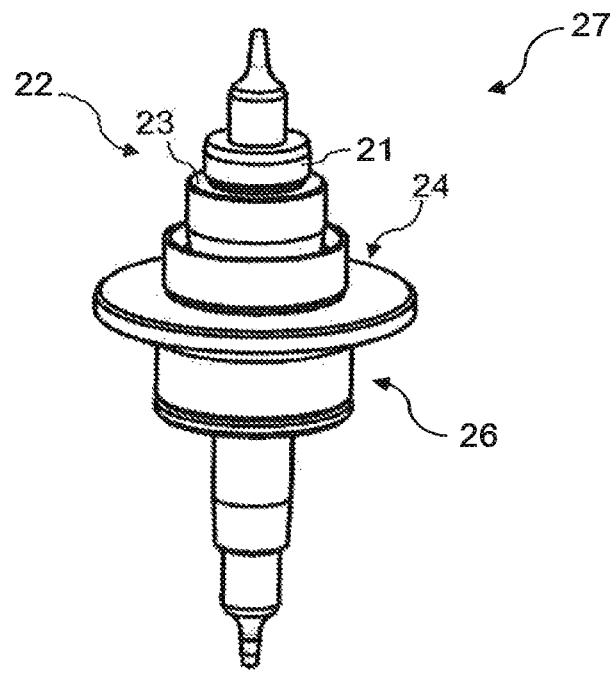
FIG. 3 is a perspective view of a balance staff according to the invention.

A staff 27 is illustrated more clearly in FIG. 3. It includes, in particular, several diameter portions 22, 24, 26 respectively intended to receive the balance spring, the balance wheel and the table-roller. As illustrated in FIG. 3, diameter portion 22 includes a cylindrical shaft 21, the lower portion of which is edged with a shoulder 23.

Figure 4:
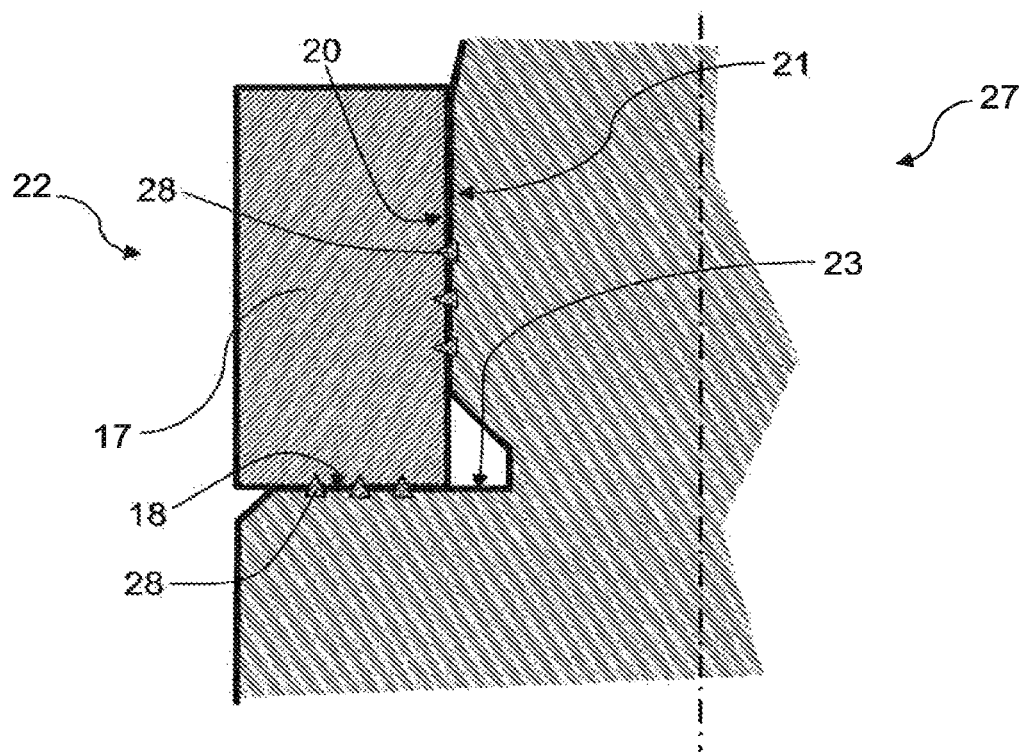
FIG. 4 is a cross-sectional view of an assembly according to WO Publication No. 2015/185423.

As illustrated in FIG. 4, diameter portion 22 is intended to receive, between shaft 21 and shoulder 23, collet 17 of balance spring 15. More specifically, the inner face 20 of collet 17 is resiliently pressed against the outer surface of shaft 21 and the lower face 18 of collet 17 is pressed against shoulder 23. Finally, as indicated at reference 28, shaft 21 and/or shoulder 23 is welded to collet 17 in accordance with the teaching of WO Publication No. 2015/185423.

However, within the context of developing the teaching of WO Publication No. 2015/185423, it very soon became clear that the gap between the parts must not exceed 0.5 micrometer, otherwise they cannot be welded together.

According to a first embodiment, the fabrication method includes a first step intended to profile-turn the shoulder of the staff in order to provide a reduced welding surface, or to limit the contact to a line, to diminish the gap to a value less than or equal to 0.5 micrometer.

The method according to the first embodiment of the invention therefore includes a first step comprising a first phase of taking a bar able to withstand profile-turning. As the example relates to an assembly between a balance spring and a balance staff, the bar may be made from a metal or from a metal alloy.

Figure 5:
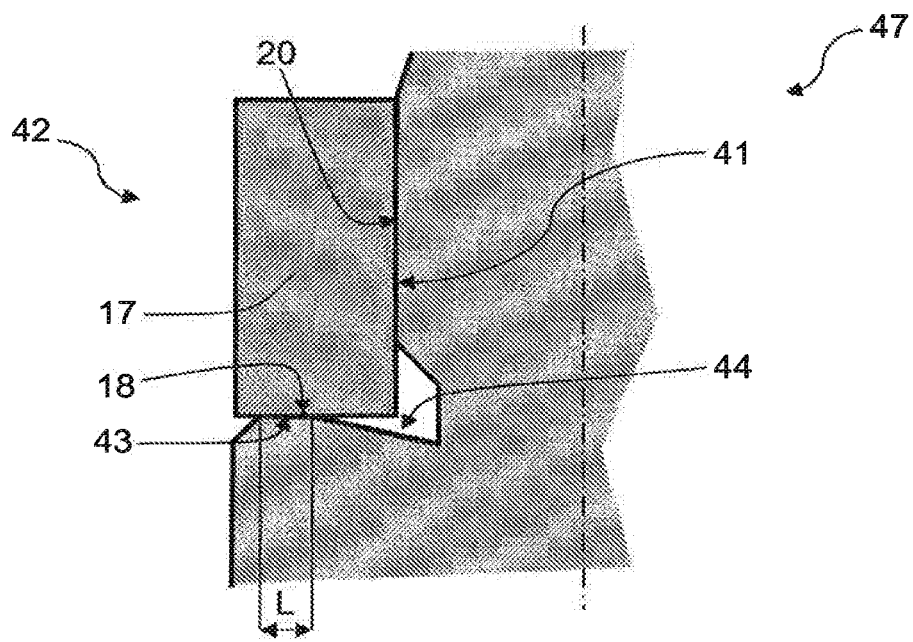
FIG. 5 is a cross-sectional view of an assembly according to a first embodiment of the invention.

The second phase is intended to profile-turn the various diameter portions required to form balance staff 47 and particularly diameter portion 42 for receiving collet 17 of balance spring 15. As seen in FIG. 5, in comparison to FIG. 4, the profile-turning phase is deliberately intended to form an oblique wall 44 starting from the undercut made by the profile-turning tool towards shoulder 43 which is still substantially perpendicular to the surface of shaft 21 but in a much more limited width L than shoulder 23 of FIG. 4. It is understood that, in the case of the staff, oblique wall 44 thus forms a cone.

Figure 6:
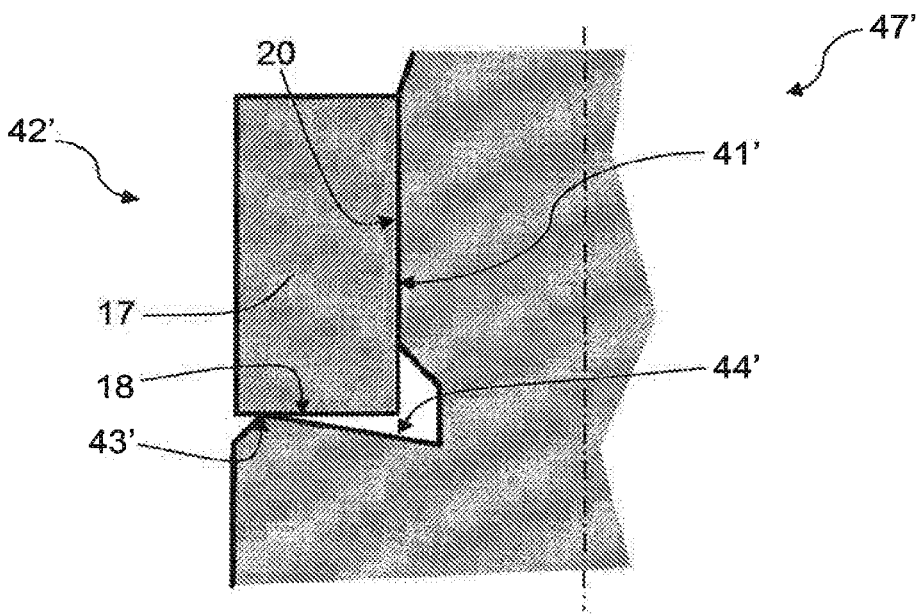
FIG. 6 is a cross-sectional view of an assembly according to a variant of a first embodiment of the invention.

Of course, according to a variant illustrated in FIG. 6, the second profile-turning phase could even be deliberately intended to form an oblique wall 44' starting from the undercut made by the profile-turning tool towards shoulder 43' and forming a line of contact instead of the more limited surface 43 illustrated in FIG. 5. It is understood that, in the case of the staff, oblique wall 44' thus forms a cone.

Figure 7:
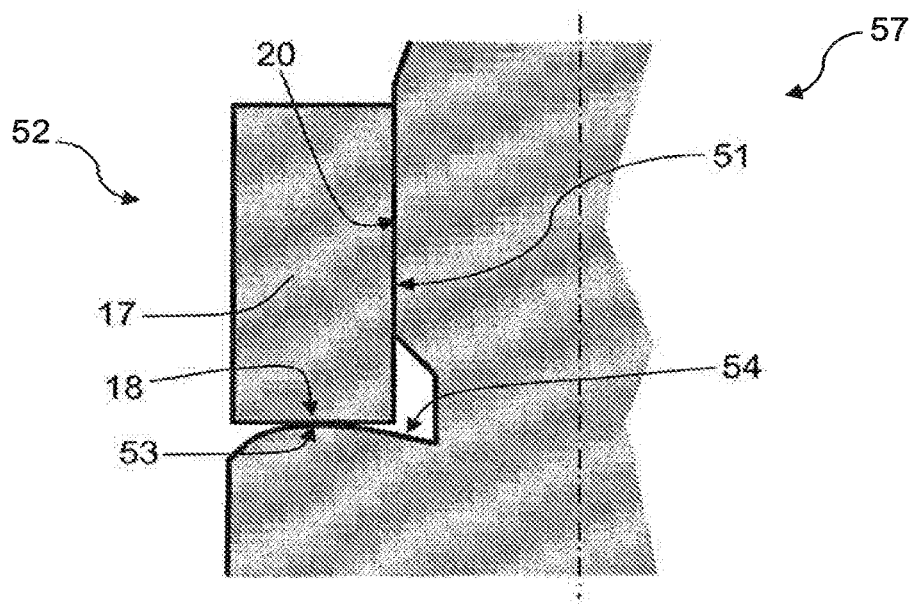
FIG. 7 is a cross-sectional view of an assembly according to an alternative of a first embodiment of the invention.

According to an alternative of the first embodiment illustrated in FIG. 7, the profile-turning phase could be deliberately intended to form a curved wall 54 starting from the undercut made by the profile profile-turning tool and forming a more centred line of contact 53 than the line of contact 43' illustrated in FIG. 6. It is clear that, in the case of the staff, curved wall 54 thus forms a toric surface.

It is thus understood that, after optional finishing phases comprising, for example, a burnishing phase and possibly a deburring phase, the staff 47, 47', 57 obtained offers a reduced welding surface 43, or limits the contact to a line 43', 53, to diminish the gap to a value less than or equal to 0.5 micrometer.

The method continues, according to the first embodiment, with a step in which collet 17 is fitted onto diameter portion 42, 42' or 52, i.e. between the surface of shaft 41, 41' or 51 and surface 43, 43' or 53. Finally, in a final welding step, the collet 17 is laser welded with the assurance that the lower face 18 and/or the inner face 20 of the balance spring 15 and staff 47, 47' or 57 are joined to each other.

According to a second embodiment, the fabrication method includes a first step intended to profile-turn the shaft of the staff in order to ensure an isostatic configuration of the fitting of the collet on the staff. It is understood that it is desired that the inner surface of the collet be able to adapt to the geometry of the shoulder, i.e. to follow the geometry of the shoulder with greater degree of freedom, in order to diminish the gap to a value less than or equal to 0.5 micrometer.

The method according to the second embodiment of the invention thus includes a first step comprising a first phase of taking a bar able to withstand profile-turning. As the example relates to an assembly between a balance spring and a balance staff, the bar may be made from a metal or from a metal alloy.

Figure 8:
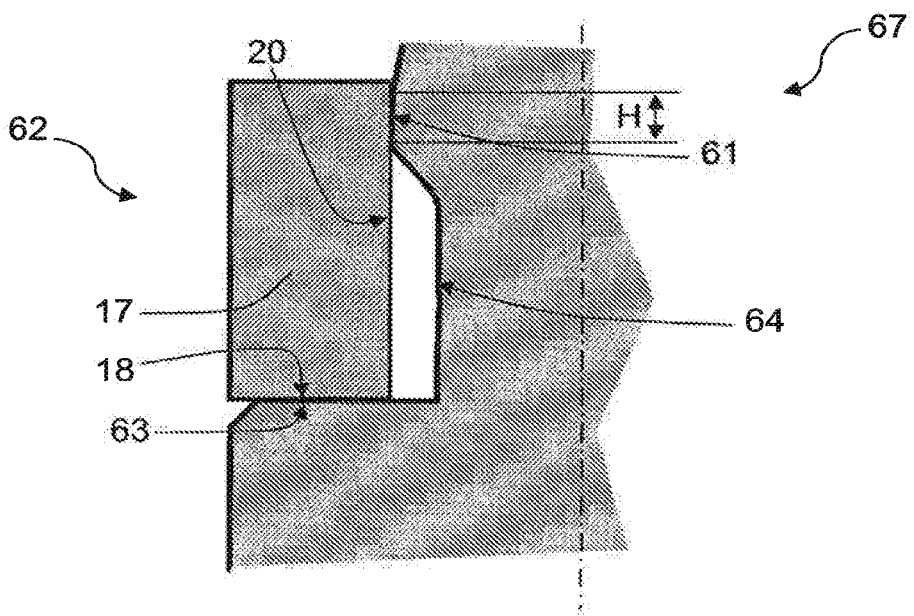
FIG. 8 is a cross-sectional view of an assembly according to a second embodiment of the invention.

The second phase is intended to profile-turn the various diameter portions required to form balance staff 67 and particularly diameter portion 62 for receiving collet 17 of balance spring 15. As seen in FIG. 8, in comparison to FIG. 4, the profile-turning phase is deliberately intended to form a more pronounced undercut 64 by the profile-turning tool towards shaft 61 but at a much more restricted height H than shaft 21 of FIG. 4. It is understood that, in the case of the staff, the surface of shaft 61 thus forms a cylinder.

Of course, according to a variant that is not illustrated, the second profile-turning phase could even be deliberately intended to form an undercut starting from shoulder 63 of the cutting tool towards shaft 61 forming a line of contact instead of the more limited surface 61 illustrated in FIG. 8.

It is thus understood that after optional finishing phases which include, for example, a burnishing phase and possible a deburring phase, the staff 67 obtained enables the inner surface 18 of collet 17 to adapt to the geometry of shoulder 63, i.e. to follow the geometry of shoulder 63 with greater degree of freedom, in order to diminish the gap to a value less than or equal to 0.5 micrometer.

The method continues, according to the second embodiment, with a step in which collet 17 is fitted onto diameter portion 62, i.e. the surface of shaft 61 and surface 63. Finally, in a final welding step, the collet 17 is laser welded with the assurance that the lower face 18 and/or the inner face 20 of the balance spring 15 and staff 67 are joined to each other.

Of course, this invention is not limited to the illustrated example but is capable of various variants and modifications which will appear to those skilled in the art. In particular, the first and second embodiments may be combined to take advantage of their combined effects.

Figure 9:
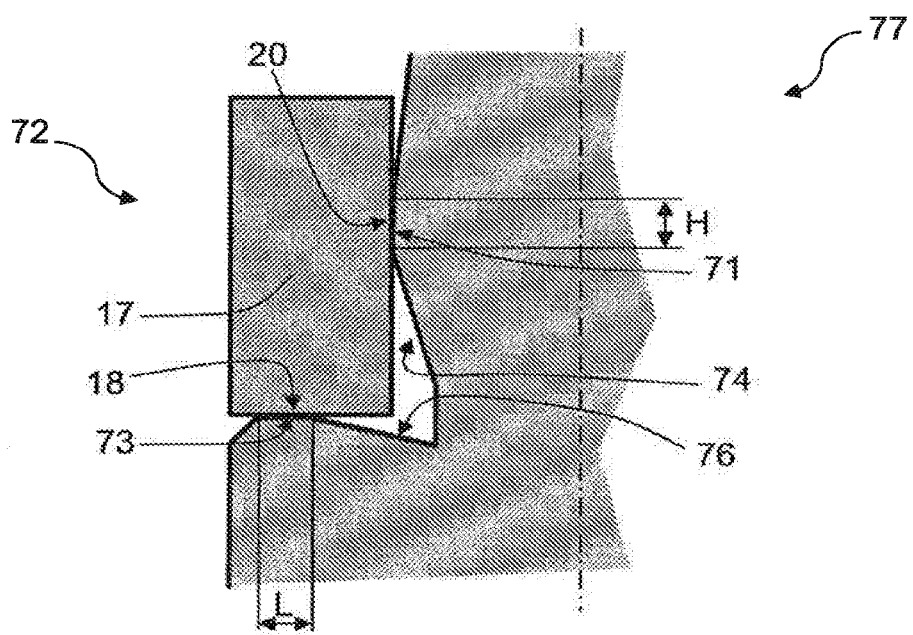
FIG. 9 is a cross-sectional view of an assembly according to a combination of the first and second embodiments of the invention.

Thus, as seen in FIG. 9, the profile-turning phase could be deliberately intended to form an oblique wall 76 starting from the undercut 74 made by the profile-turning tool and forming a more reduced contact surface 73 than the contact surface 23 illustrated in FIG. 4. It is understood that, in the case of staff 77, the oblique wall 76 thus forms a cone. Further, the profile-turning phase may also deliberately form a more pronounced undercut 74 made by the profile-turning tool towards shaft 71 but at a much more restricted height H than shaft 21 of FIG. 4. It is understood that, in the case of the staff, the surface of shaft 71 thus forms a cylinder.

It is thus noted that staff 77 advantageously offers a face 73 with a reduced welding surface to ensure the welding thereof but also a contact face 71 with a reduced surface ensuring an isostatic configuration of the fitting of staff 77 onto diameter portion 72, in order to further diminish the fitting gap thereby further improving the welding with the lower face 18 and/or the inner face 20 of the balance spring 15.

What is claimed:

1. A method for fabrication of a timepiece component comprising the following steps:
    forming a first part made from metal and a second part made from silicon or ceramic;
    mounting a surface of the first part on a surface of the second part
    welding, by laser electromagnetic radiation, the surface of the first part mounted on the surface of the second part, in order to secure the parts to each other and to form the timepiece component;
wherein the step of forming the first part includes the following phases:
    taking a bar;
    profile-turning the bar to form at least one diameter portion comprising a substantially vertical surface and a substantially horizontal surface and an oblique wall between the substantially vertical surface and the substantially horizontal surface in order to reduce the substantially horizontal surface to receive the surface of the second part.

2. The method according to claim 1, wherein the second part also includes at least a partial coating of metal, silicon oxide, silicon nitride, silicon carbide or an allotrope of carbon.

3. The method according to claim 1, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

4. The method according to claim 1, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

5. A method for fabrication of a timepiece component comprising the following steps:
    forming a first part made from metal and a second part made from silicon or ceramic;
    mounting a surface of the first part on a surface of the second part;
    welding, by laser electromagnetic radiation, the surface of the first part mounted on the surface of the second part, in order to secure the parts to each other and to form the timepiece component;
wherein the step of forming the first part includes the following phases:
    taking a bar;
    profile-turning the bar to form at least one diameter portion comprising a substantially vertical surface and a substantially horizontal surface and a curved wall around the substantially horizontal surface so that the substantially horizontal surface is limited to a line for receiving the surface of the second part.

6. The method according to claim 5, wherein the second part also includes at least a partial coating of metal, silicon oxide, silicon nitride, silicon carbide or an allotrope of carbon.

7. The method according to claim 5, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

8. The method according to claim 5, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

9. A method for fabrication of a timepiece component comprising the following steps:
    forming a first part made from metal and a second part made from silicon or ceramic;
    mounting a surface of the first part on a surface of the second part;
    welding, by laser electromagnetic radiation, the surface of the first part mounted on the surface of the second part, in order to secure the parts to each other and to form the timepiece component;
wherein the step of forming the first part includes the following phases:
    taking a bar;
    profile-turning the bar to form at least one diameter portion comprising a substantially vertical surface and a substantially horizontal surface and an undercut between the substantially vertical surface and the substantially horizontal surface intended to reduce the substantially vertical surface to receive the surface of the second part.

10. The method according to claim 9, wherein the second part also includes at least a partial coating of metal, silicon oxide, silicon nitride, silicon carbide or an allotrope of carbon.

11. The method according to claim 9, wherein the first part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

12. The method according to claim 9, wherein the second part forms all or part of a case, a dial, a flange, a crystal, a bezel, a push-piece, a crown, a case back, a hand, a bracelet or strap, a balance spring, a balance wheel, a pallets, a bridge, an oscillating weight, a wheel or an escape wheel.

* * * * *